United States Patent
Hsiao et al.

(10) Patent No.: US 8,036,190 B2
(45) Date of Patent: Oct. 11, 2011

(54) METHODS AND DEVICES FOR ALLOCATING DATA IN A WIRELESS COMMUNICATION SYSTEM

(75) Inventors: Chang-Lung Hsiao, Taipei (TW); Ren-Jr Chen, Hsinchu (TW); Wern-Ho Sheen, Chiayi County (TW)

(73) Assignee: Industrial Technology Research Institute, Hsinchu (TW)

( * ) Notice: Subject to any disclaimer, the term of this patent is extended or adjusted under 35 U.S.C. 154(b) by 870 days.

(21) Appl. No.: 12/036,175

(22) Filed: Feb. 22, 2008

(65) Prior Publication Data

US 2008/0205337 A1  Aug. 28, 2008

Related U.S. Application Data (60) Provisional application No. 60/903,897, filed on Feb. 7, 2007.

(51) Int. Cl.
*H04W 4/00* (2009.01)
(52) U.S. Cl. ........................................ 370/338
(58) Field of Classification Search ........................ None
See application file for complete search history.

(56) References Cited

U.S. PATENT DOCUMENTS

| 7,623,487 | B2 * | 11/2009 | Zhang et al. | 370/328 |
|---|---|---|---|---|
| 2007/0155387 | A1 * | 7/2007 | Li et al. | 455/441 |
| 2007/0159959 | A1 * | 7/2007 | Song et al. | 370/208 |
| 2007/0177494 | A1 * | 8/2007 | Tomizawa | 370/208 |
| 2009/0279589 | A1 * | 11/2009 | Nguyen | 375/141 |

* cited by examiner

*Primary Examiner* — Chirag Shah
*Assistant Examiner* — Amar Persaud
(74) *Attorney, Agent, or Firm* — Alston & Bird LLP (57) ABSTRACT

A system and method for identifying a resource region including a plurality of symbols, allocating pilot signals to the resource region, identifying pilot-free symbols free of the pilot signals in the plurality of symbols, arranging sacrifice carriers for a first region of a group of symbols in the pilot-free symbols at a first density for a first communication station, and arranging sacrifice carriers for a second region of the group of symbols in the pilot-free symbols at a second density for a second communication station, the first communication station mobile with respect to an access communication station at a first relative speed and the second communication station is mobile with respect to the access communication station at a second relative speed, and wherein the first density of sacrifice carriers is greater than the second density of sacrifice carriers if the first relative speed is greater than the second relative speed.

22 Claims, 12 Drawing Sheets

FIG. 1A LOW RELATIVE SPEED

FIG. 1B MEDIUM RELATIVE SPEED

FIG. 1C HIGH RELATIVE SPEED

METHODS AND DEVICES FOR ALLOCATING DATA IN A WIRELESS COMMUNICATION SYSTEM

CROSS-REFERENCE TO RELATED APPLICATIONS

This application is related to and hereby claims the priority benefit of U.S. Provisional Application No. 60/903,897, filed Feb. 27, 2007, incorporated herein by reference in its entirety.

BACKGROUND OF THE INVENTION

The present invention generally relates to telecommunications and, more particularly, to methods and devices for allocating data in a wireless communication system.

In telecommunications systems, channel estimation may be performed for coherent detection to compensate for distortion or errors introduced due to channel fading. One technique for estimating a channel may include the use of pilot signals or pilot symbols. A transmitter or transmitting side may send pilot signals to a receiver or receiving side through predetermined sub-carriers. The receiver may be programmed with the pilot signals so that the pilot signals sent from the transmitter are "known" to the receiver. Upon receiving the pilot signals, the receiver may estimate the channel by comparing the transmission the receiver actually receives with the known symbols that the receiver ideally should have received. Pilot signals may be continually transmitted from a transmitter to a receiver because the channel may be constantly changing. Furthermore, pilot signals may be transmitted across a wide range of frequencies or sub-carriers because the channel may vary with frequency.

The use of pilot signals may be a trade-off between accurate channel estimation and data bandwidth. Specifically, when more pilot signals are used, more accurate channel estimation may be achieved and, however, more sub-carriers may be used to transmit the pilot signals rather than data. On the contrary, when less pilot signals are used, more sub-carriers may be used to transmit data and, however, a higher frame error rate may result. Therefore, it may be desirable to have methods and devices that are able to enable accurate channel estimation without adversely affecting the entire throughput. Furthermore, the characteristics of a channel may change as the relative speed between a transmitter and a receiver changes. Therefore, it may also be desirable to have methods and devices that are able to allocate pilot signals based on the relative speed between the transmitter and the receiver.

BRIEF SUMMARY OF THE INVENTION

Examples of the present invention may provide a method of data communication in a multi-user, multi-carrier wireless communication system, the method comprising identifying a resource region including a plurality of symbols, allocating pilot signals to the resource region, identifying pilot-free symbols free of the pilot signals in the plurality of symbols, arranging sacrifice carriers for a first region of a group of symbols in the pilot-free symbols at a first density for a first communication station, and arranging sacrifice carriers for a second region of the group of symbols in the pilot-free symbols at a second density for a second communication station, wherein the first communication station is mobile with respect to an access communication station at a first relative speed and the second communication station is mobile with respect to the access communication station at a second relative speed, and wherein the first density of sacrifice carriers is greater than the second density of sacrifice carriers if the first relative speed is greater than the second relative speed.

Some examples of the present invention may also provide a method of data communication in a multi-user, multi-carrier communication wireless system, the method comprising identifying at least one resource region each including a plurality of symbols, assigning a first one of the at least one resource region to at least one communication device having a first relative speed, assigning a second one of the at least one resource region to at least one communication device having a second relative speed, the second relative speed being greater than the first relative speed, allocating at least one of data or data and pilot signals to carriers in each of the first one and the second one of the at least one resource region, arranging sacrifice carriers free of the data and pilot signals for the first one of the at least one resource region at a first density, and arranging sacrifice carriers free of the data and pilot signals for the second one of the at least one resource region at a second density; the second density of sacrifice carriers being greater than the first density of sacrifice carriers.

Examples of the present invention may further provide a device for data communication in a multi-user, multi-carrier wireless communication system, the device comprising a speed detector configured to detect a first relative speed of a first communication station relative to an access communication station and a second relative speed of a second communication station relative to the access communication station, an adaptive pilot inserting module configured to allocate pilot signals to a resource region based on the first relative speed and the second relative speed, the resource region including a plurality of symbols, and an adaptive carrier mapping module configured to allocate data to the resource region, wherein the adaptive carrier mapping module is configured to arrange sacrifice carriers in a first region of the resource region at a first density for the first communication station, and arrange sacrifice carriers in a second region of the resource region at a second density for the second communication station, and wherein the first density of sacrifice carriers is greater than the second density of sacrifice carriers if the first relative speed is greater than the second relative speed, and vice versa.

Additional features and advantages of the present invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings examples which are presently preferred. It should be understood, however, that the invention is not limited to the precise arrangements and instrumentalities shown.

In the drawings.

DETAILED DESCRIPTION OF THE INVENTION

Reference will now be made in detail to the present examples of the invention illustrated in the accompanying drawings. Wherever possible, the same reference numbers will be used throughout the drawings to refer to the same or like portions.

Figure 1A:
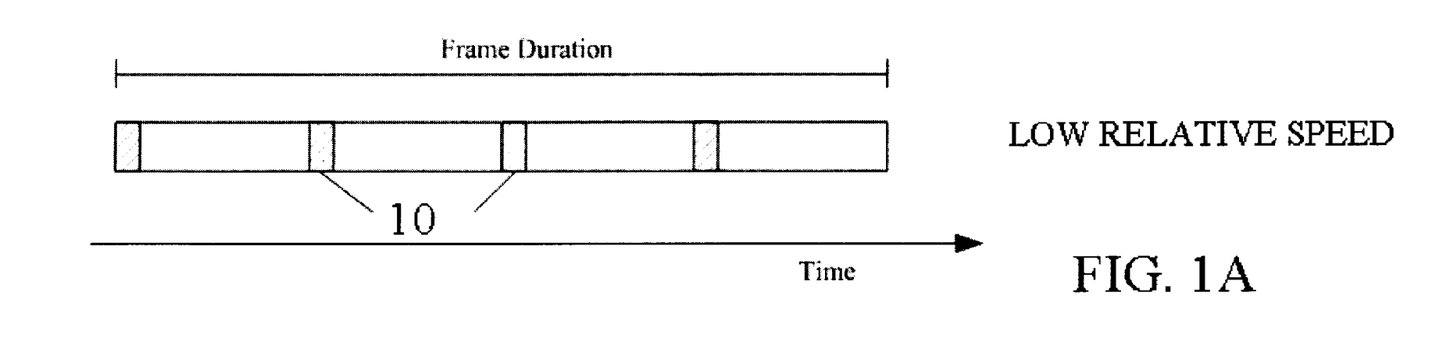
FIGS. 1A, 1B and 1C are schematic diagrams illustrating a method of allocating pilot signals consistent with an example of the present invention.
Figure 1B:
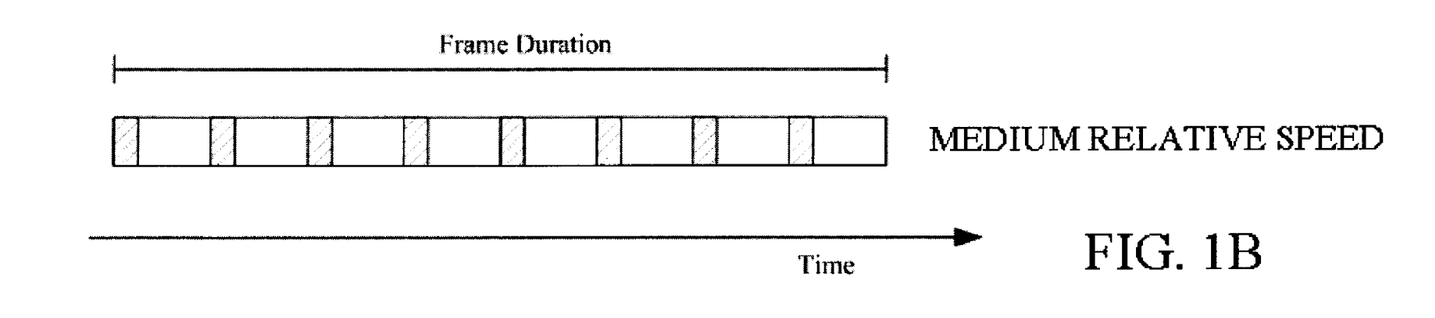
Figure 1C:
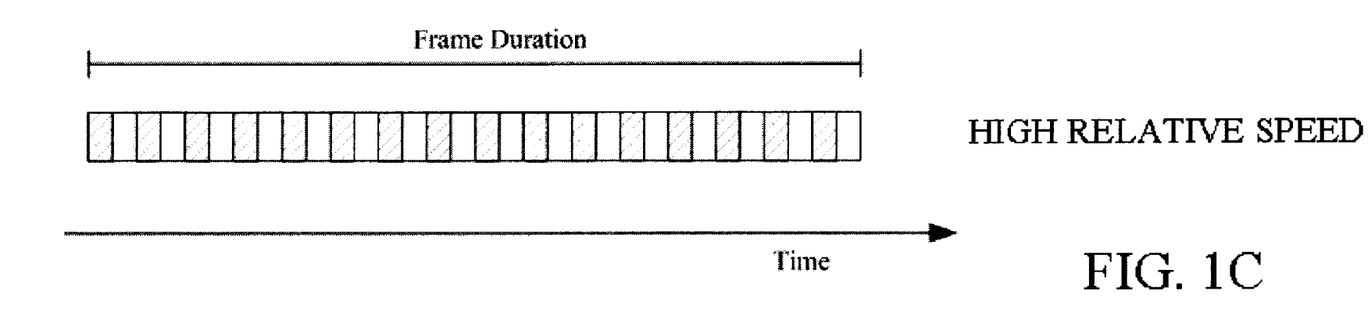

FIGS. 1A, 1B and 1C are schematic diagrams illustrating a method of allocating pilot signals consistent with an example of the present invention. Pilot signals or pilot symbols may be transmitted from a transmitter such as a mobile station over a channel to a receiver such as a base station, or vice versa. In one example consistent with the present invention, a transmitter may include one of a base station, a relay station and a mobile station. Furthermore, a receiver may also include one of a base station, a relay station and a mobile station. In another example, a base station may be mobile with respect to a relay station, and vice versa. The channel characteristics may vary as the relative speed between the transmitter and the receiver varies. In one example according to the present invention, pilot signals may be allocated at a higher density with respect to time in response to a higher relative speed. Referring to FIG. 1A, when a first relative speed between a transmitter and a receiver is relatively low, channel variation may be relatively small or insignificant. In such a case, pilot signals 10 may be allocated at a first density with respect to time, which may be relatively small. As compared to a conventional method of pilot allocation wherein a predetermined number of pilot signals are arranged in an entire frame irrespective of the relative speed, the first pilot density according to the present invention may help increase the throughput without adversely affecting the accuracy in channel estimation.

Referring to FIG. 1B, when a second relative speed between a transmitter and a receiver is higher than the first relative speed in the example described and illustrated with reference to FIG. 1A, channel variation may be higher or more significant than that illustrated in FIG. 1A. In that case, pilot signals may be allocated at a second density with respect to time, which is greater than the first density. As compared to the above-mentioned conventional method, the second pilot density may achieve more accurate channel estimation.

Referring to FIG. 1C, when a third relative speed between a transmitter and a receiver is higher than the second relative speed at in the example described and illustrated with reference to FIG. 1B, channel variation may be higher or more significant than that illustrated in FIG. 1B. In that case, pilot signals may be allocated at a third density with respect to time, which is greater than the second density. In one example according to the present invention, the first, second and third relative speeds may respectively range from, for example, approximately 0 to 60, 60 to 120 and more than 120 kilometers per hour (Km/hr).

Figure 2A:
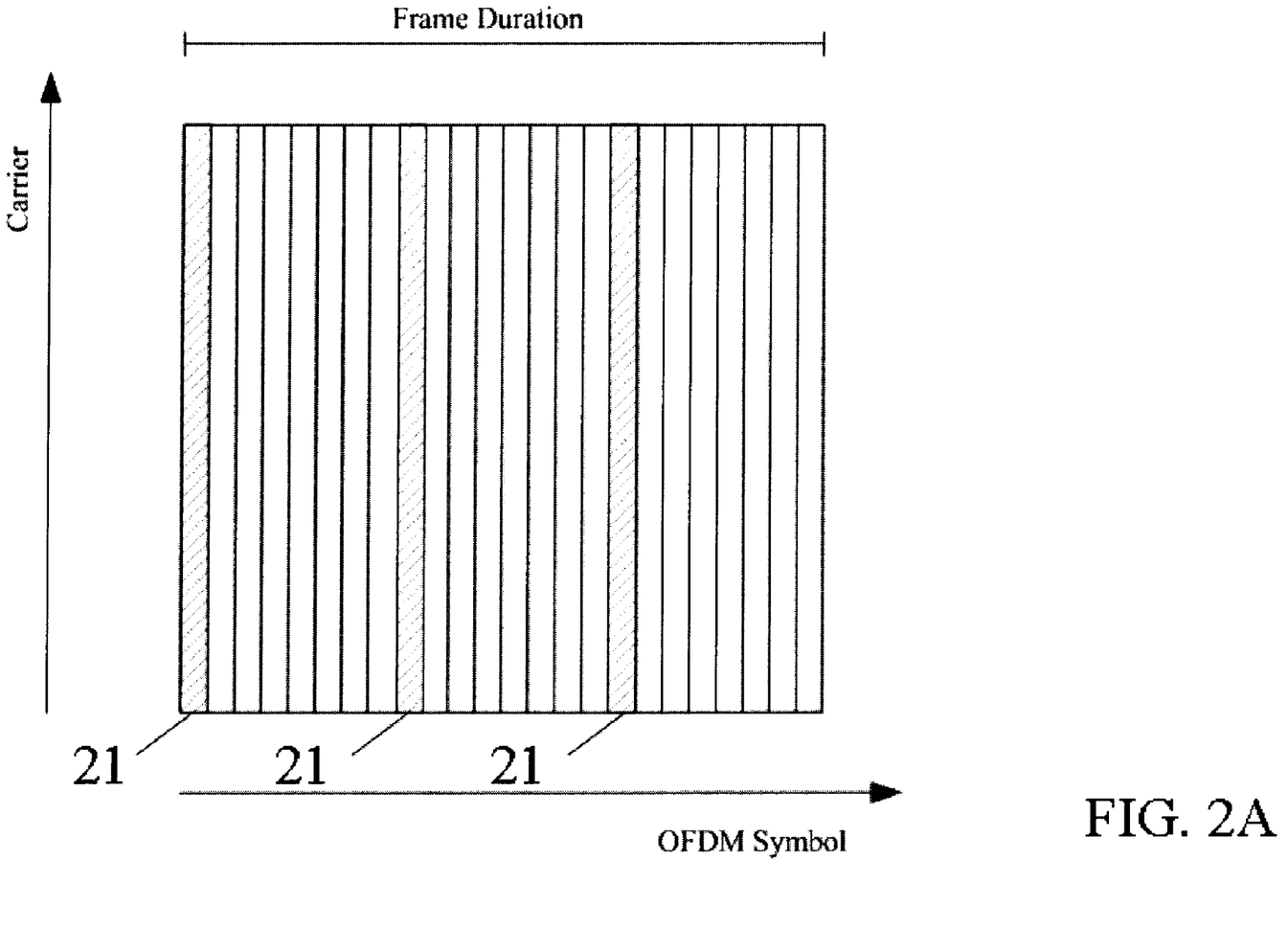
FIGS. 2A, 2B and 2C are schematic diagrams illustrating a method of allocating pilot signals in an orthogonal frequency division multiplexing (OFDM)-based communication system.
Figure 2B:
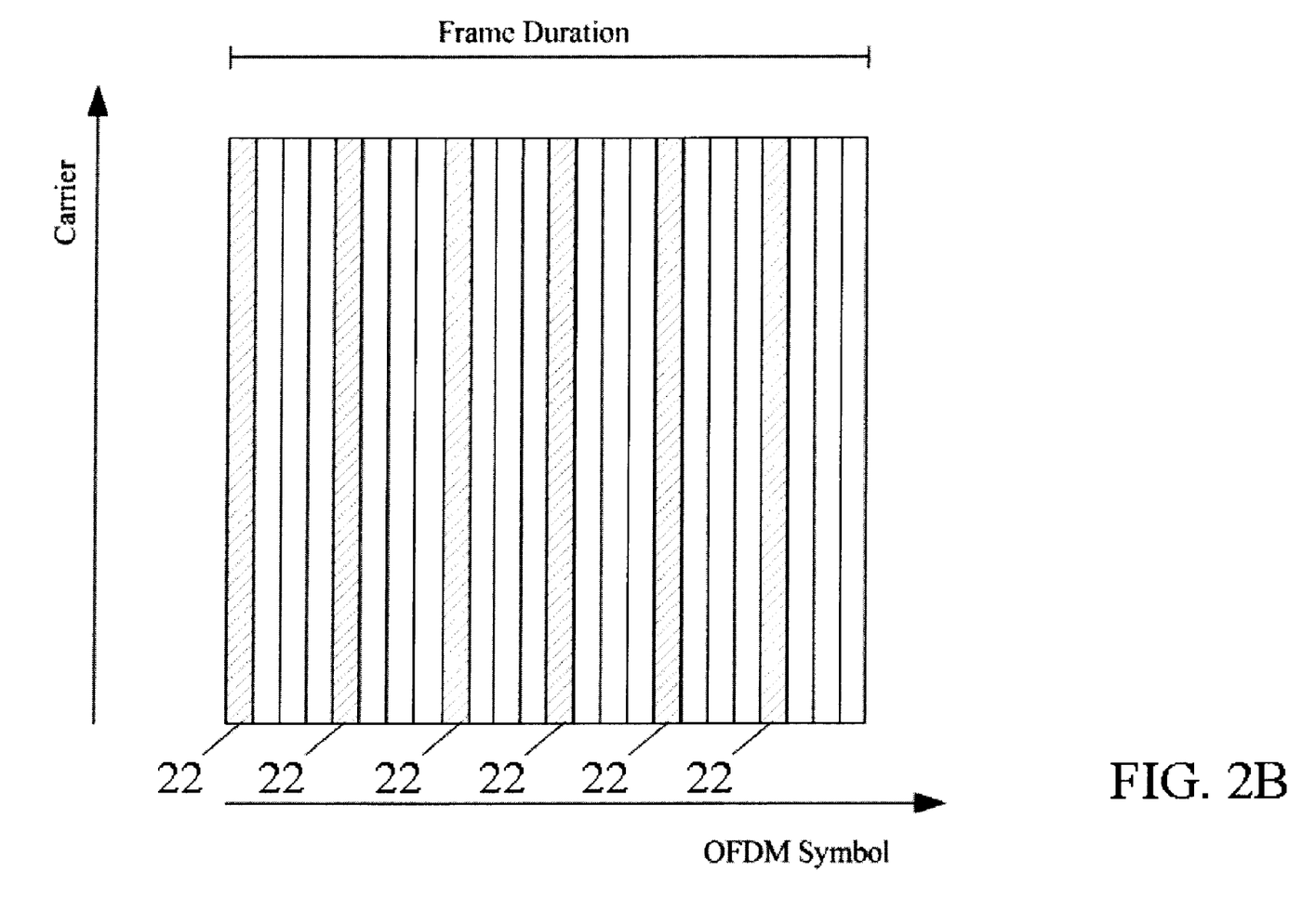
Figure 2C:
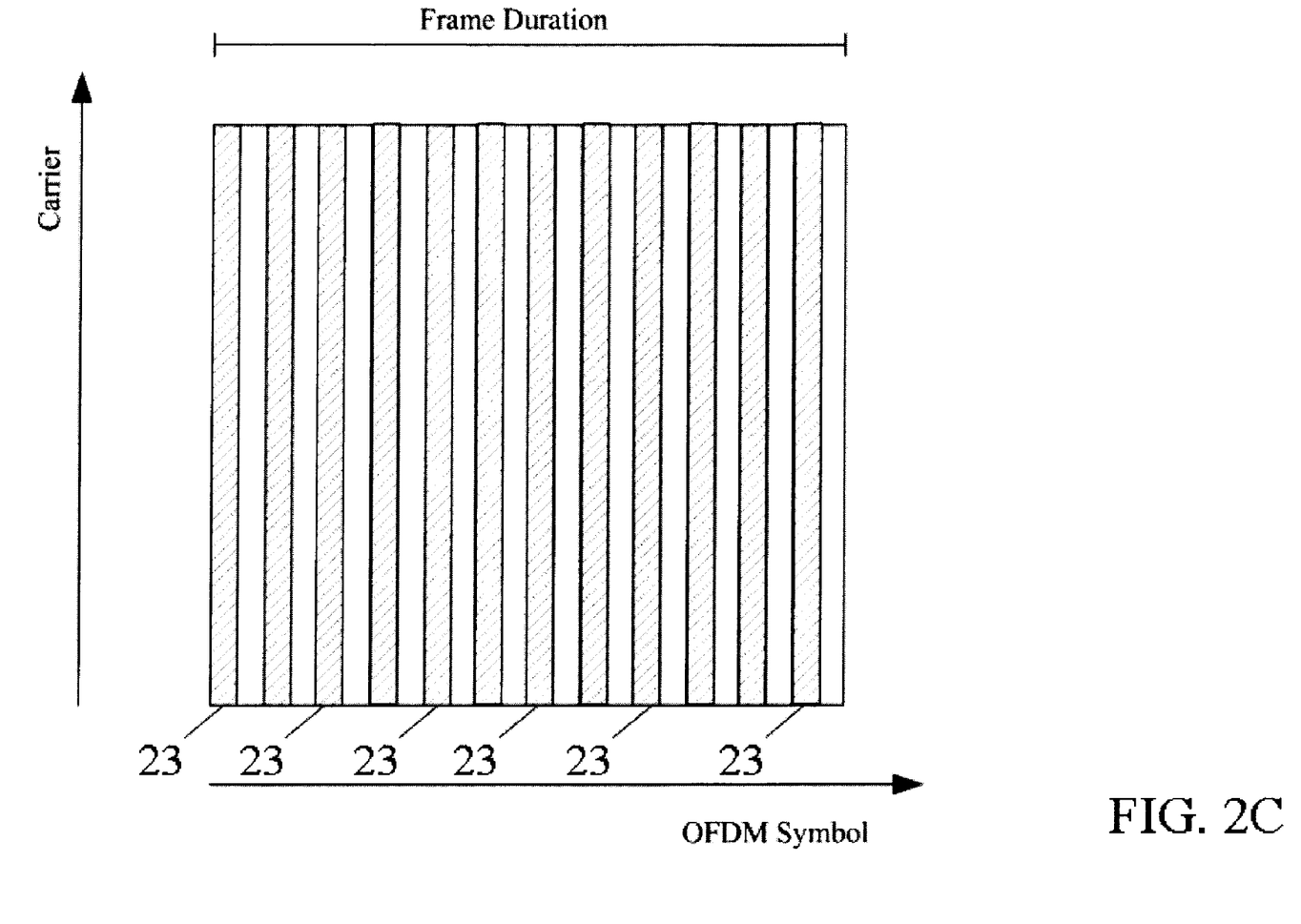

FIGS. 2A, 2B and 2C are schematic diagrams illustrating a method of allocating pilot signals in an orthogonal frequency division multiplexing (OFDM)-based communication system. An OFDM frame may include a plurality of OFDM symbols, each of which may include a plurality of carriers. In one example according to the present invention, a density of OFDM symbols to which pilot signals are allocated in a frame may be higher as a relative speed between a transmitter and a receiver in an OFDM system is higher. Referring to FIG. 2A, when a first relative speed between a transmitter and a receiver in an OFDM system is relatively low, channel variation may be relatively small or insignificant. In such a case, a first density of OFDM symbols 21 (shown in oblique lines) to which pilot signals are allocated may be relatively small. In at least one of the OFDM symbols 21, in one example, pilot signals may be arranged to separate from each other by a predetermined number of carrier spacings. Furthermore, skilled persons in the art will understand that carriers not used to transmit pilot signals may be used to transmit data symbols.

Referring to FIG. 2B, when a second relative speed between a transmitter and a receiver in an OFDM system is higher than the first relative speed in the example described and illustrated in FIG. 2A, a second density of OFDM symbols 22 to which pilot signals are allocated may be greater than the first density. Referring to FIG. 2C, similarly, when a third relative speed between a transmitter and a receiver in an OFDM system is higher than the second relative speed in the example described and illustrated in FIG. 2B, a third density of OFDM symbols 23 to which pilot signals are allocated may be greater than the second density.

Figure 3:
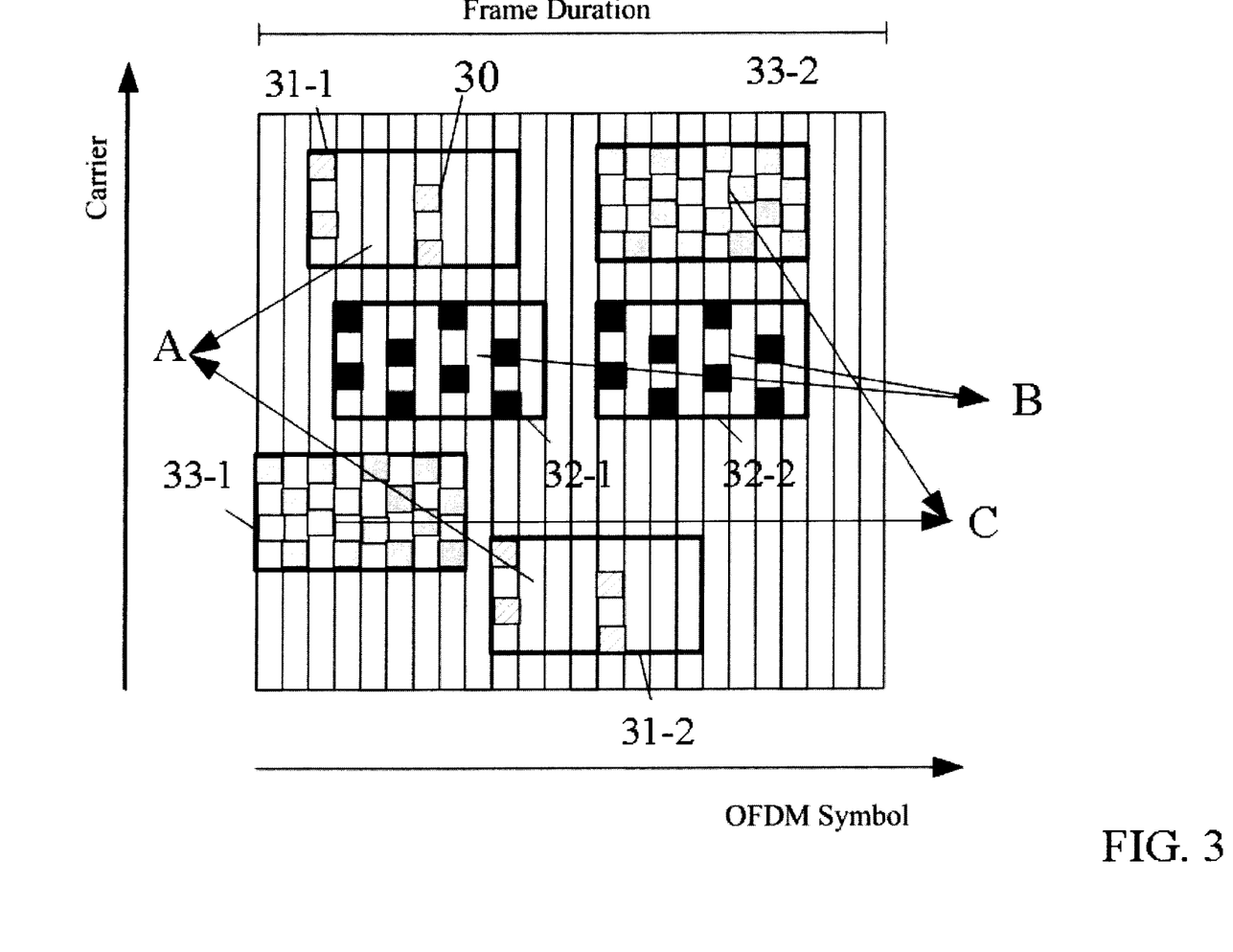
FIG. 3 is an exemplary diagram illustrating a method of allocating pilot signals in an orthogonal frequency division multiple access (OFDMA)-based communication system.

FIG. 3 is an exemplary diagram illustrating a method of allocating pilot signals in an orthogonal frequency division multiple access (OFDMA)-based communication system. OFDMA may refer to a multi-user version of the OFDM digital modulation scheme, which supports multi-carrier, multi-user wireless communications. Multiple access may be achieved in OFDMA by assigning subsets of sub-carriers to individual users. Accordingly, OFDMA may allow simultaneous low data rate transmission from several users. One of the significant characteristics of an OFDMA-based communication system is that a user can use portions of carriers and portions of OFDM symbols in a frame. Referring to FIG. 3, communication devices A, B and C, which may include one of a transmitter and a receiver in an OFDMA system, may be assigned with at least one resource region or resource block in a frame. For example, regions 31-1 and 31-2 may be assigned to the communication device A, regions 32-1 and 32-2 may be assigned to the communication device B, and regions 33-1 and 33-2 may be assigned to the communication device C. During the frame, among the communication devices A, B and C, the communication device A may have the smallest relative speed and the communication device C may have the highest relative speed. In one example consistent with the present invention, the higher the relative speed, the greater the density of OFDM symbols to which pilot signals are allocated in a region. Accordingly, the density of OFDM symbols to which pilot signals are allocated in the regions 31-1 and 31-2 may be smaller than that of OFDM symbols to which pilot signals are allocated in the regions 32-1 and 32-2, which in turn may be smaller than that of OFDM symbols to which pilot signals are allocated in the regions 33-1 and 33-2. In one example, pilot signals in a symbol within a region may be arranged to separate from each other by a predetermined number of carrier spacings. In other examples, however, pilot signals may be separated from each other by an arbitrary number of carrier spacings. An example of allocation of pilot signals with various carrier spacings will be described and illustrated with reference to FIG. 6. Furthermore, the number of regions assigned to a communication device in a frame may vary in other applications. Moreover, regions assigned to a communication device may have different sizes.

Figure 4:
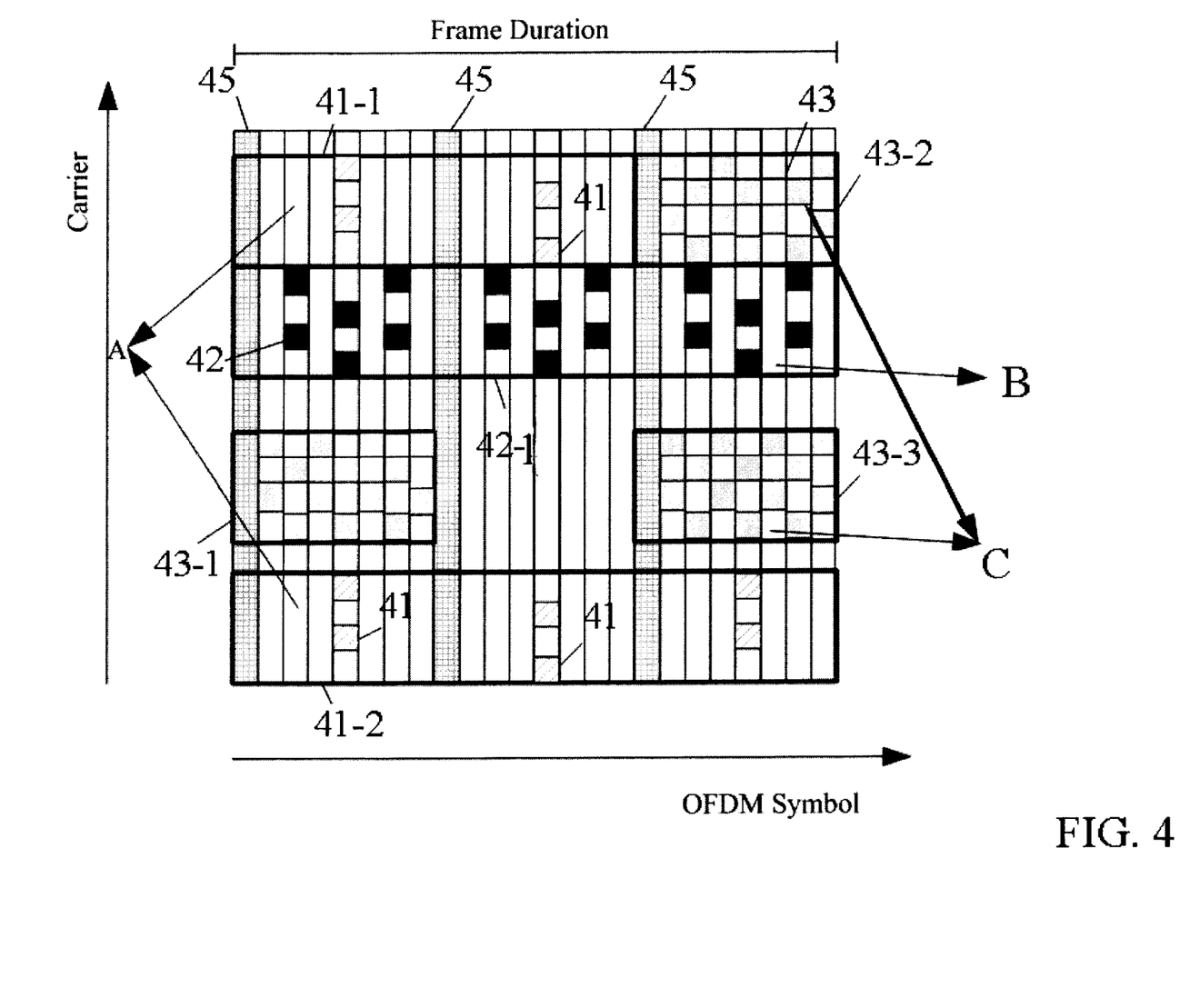
FIG. 4 is another exemplary diagram illustrating a method of allocating pilot signals in an OFDMA-based communication system.

FIG. 4 is another exemplary diagram illustrating a method of allocating pilot signals in an OFDMA-based communication system. Referring to FIG. 4, regions 41-1 and 41-2 may be assigned to the communication device A, a region 42-1 may be assigned to the communication device B, and regions 43-1, 43-2 and 43-3 may be assigned to the communication device C. During the frame, among the communication devices A, B and C, the communication device A may have the smallest relative speed and the communication device C may have the highest relative speed. In one example consistent with the present invention, the higher the relative speed, the greater the density of OFDM symbols to which pilot signals are allocated. Accordingly, a first density of OFDM symbols to which pilot signals 41 are allocated in the regions 41-1 and 41-2 may be smaller than a second density of OFDM symbols to which pilot signals 42 are allocated in the region 42-1, which in turn may be smaller than a third density of OFDM symbols to which pilot signals 43 are allocated in the regions 43-1, 43-2 and 43-3. Furthermore, a fourth density of OFDM symbols 45 to which a predetermined number of pilot signals may be allocated may be provided across the frame. In that case, the number of pilot signals allocated at the first, second and third densities may be decreased.

Figure 5:
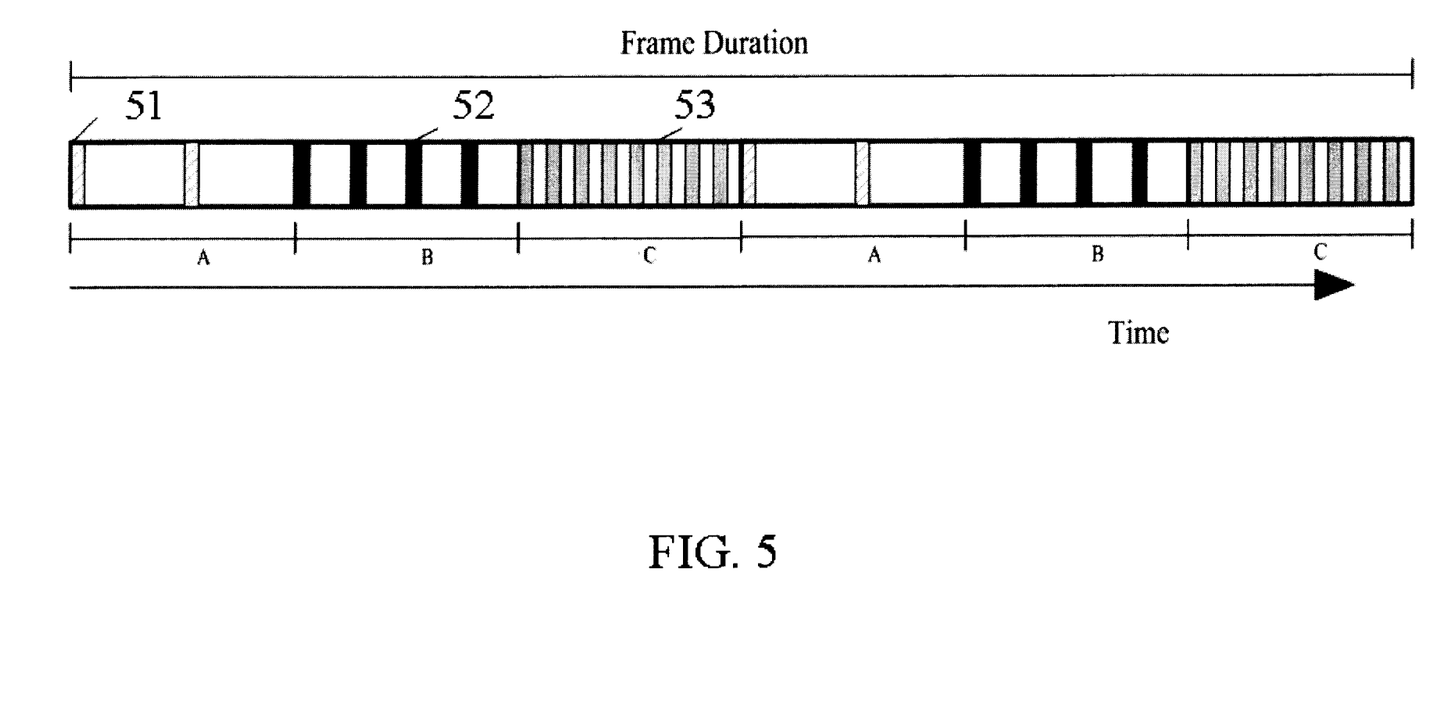
FIG. 5 is an exemplary diagram illustrating a method of allocating pilot signals in a time division multiple access (TDMA)-based communication system.

FIG. 5 is an exemplary diagram illustrating a method of allocating pilot signals in a time division multiple access (TDMA)-based communication system. TDMA may refer to a channel access scheme for shared medium networks, which allows several users to share the same frequency channel by dividing the signal into different timeslots. Referring to FIG. 5, the communication devices A, B and C may transmit in succession in a frame, one after the other, each using its own timeslot. Since the communication device A may have a relatively low relative speed in a TDMA system, pilot signals 51 may be allocated at a relatively low density. On the other hand, since the communication device C may have a relatively high relative speed in the TDMA system, pilot signals 53 may be allocated at a relatively high density. Furthermore, pilot signals 52 may be allocated at a density between the relatively low density and the relatively high density because the communication device B may have a relative medium speed between the relatively low relative speed and the relatively high relative speed.

Figure 6A:
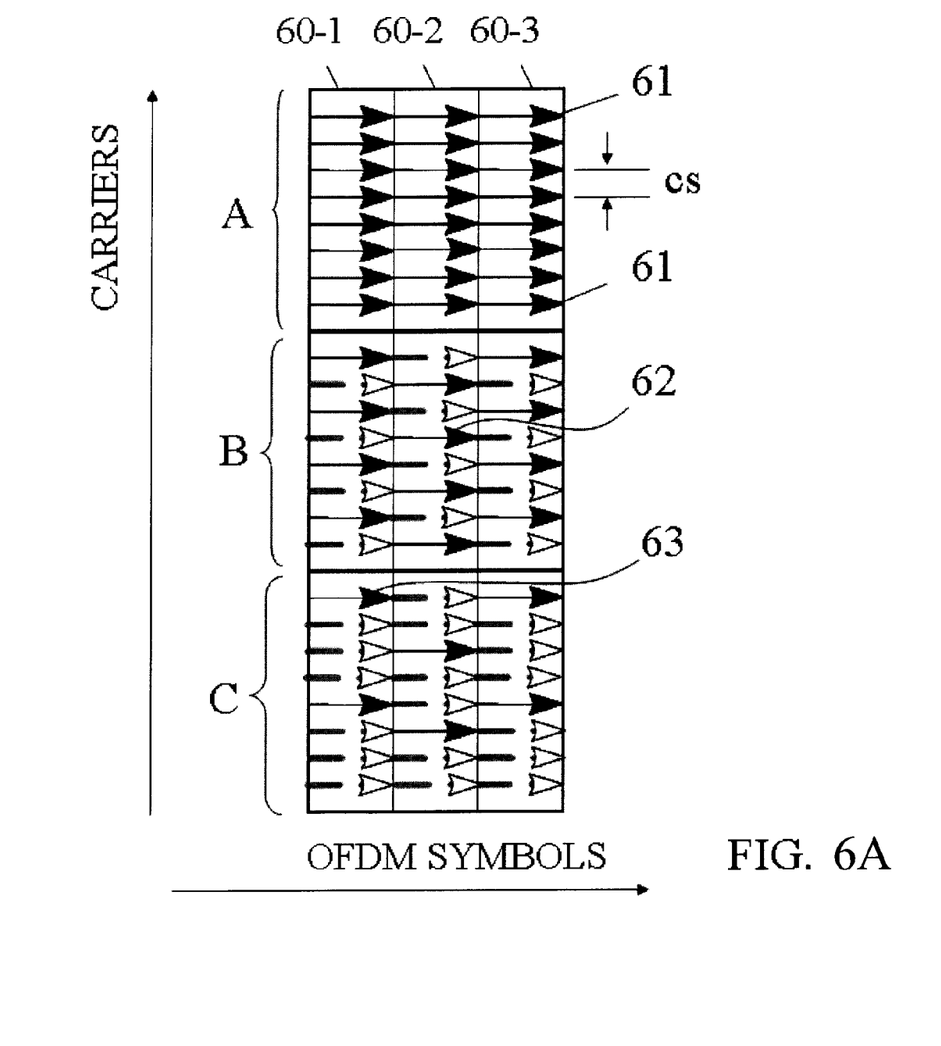
FIG. 6A is an exemplary diagram illustrating a method of allocating data symbols in an OFDMA-based system.

FIG. 6A is an exemplary diagram illustrating a method of allocating data symbols in an OFDMA-based system. Referring to FIG. 6A, symbols 60-1, 60-2 and 60-3, which may not include pilot signals and may be disposed between symbols that include pilot signals in a resource region, may be used to transmit data. In an OFDMA-based system, inter-carrier interference (ICI) may incur significant adverse effects in relatively high relative speed communications. To alleviate the ICI effect, carriers in the symbols 60-1 to 60-3 of the resource region, which may be used to transmit data symbols, may be sacrificed, which may not carry any data or pilots or may carry only logical-zero bits. Such carriers are termed "sacrifice carriers" throughout the specification.

In one example, the lower the relative speed between a transmitter and a receiver, the higher the density of data may be allocated and the lower the density of sacrifice carriers may be arranged in pilot-free symbols. For example, since the communication device A may have a relatively low relative speed with respect to an access station such as a base station or a relay station in an OFDMA system, data symbols may be allocated at a relatively high density while sacrifice carriers may be arranged at a relatively low density. In the present example, all of the carriers may be used to transmit data and no carriers are sacrificed. On the other hand, since the communication device C may have a relatively high relative speed with respect to the access station in the OFDMA system, data symbols may be allocated at a relatively low density while sacrifice carriers may be arranged at a relatively high density. In the present example, only two carriers are used to transmit data and six carriers are sacrificed in the symbol 60-1, 60-2 or 60-3 assigned to the communication device C in the resource region. In FIG. 6A, for the purpose of simplicity, a dark arrowhead may represent a carrier used to transmit data, and a white arrowhead may represent a sacrifice carrier. A data carrier may contain control signals, user data or broadcast information.

In the present example as illustrated, data carriers 61 in a first portion of the OFDM symbols 60-1, 60-2 and 60-3 with respect to the communication device A may be allocated at a first density. Specifically, one of the data carriers 61 in a same symbol such as the symbol 60-3 of the first portion of the OFDM symbols 60-1, 60-2 and 60-3 may be separated from a neighboring data carrier by, for example, one carrier spacing (cs) or by no sacrifice carriers. Furthermore, data carriers 62 in a second portion of the OFDM symbols 60-1, 60-2 and 60-3 with respect to the communication device B may be allocated at a second density smaller than the first density. Specifically, one of the data carriers 62 in a same symbol such as the symbol 60-2 of the second portion of the OFDM symbols may be separated from a neighboring data carrier by, for example, one sacrifice carrier. Moreover, data carriers 63 in a third portion of the OFDM symbols 60-1, 60-2 and 60-3 with respect to the communication device C may be allocated at a third density smaller than the second density. Specifically, one of the data carriers 63 in a same symbol such as the symbol 60-1 of the third portion of the OFDM symbols may be separated from a neighboring data carrier by, for example, three sacrifice carriers.

Figure 6B:
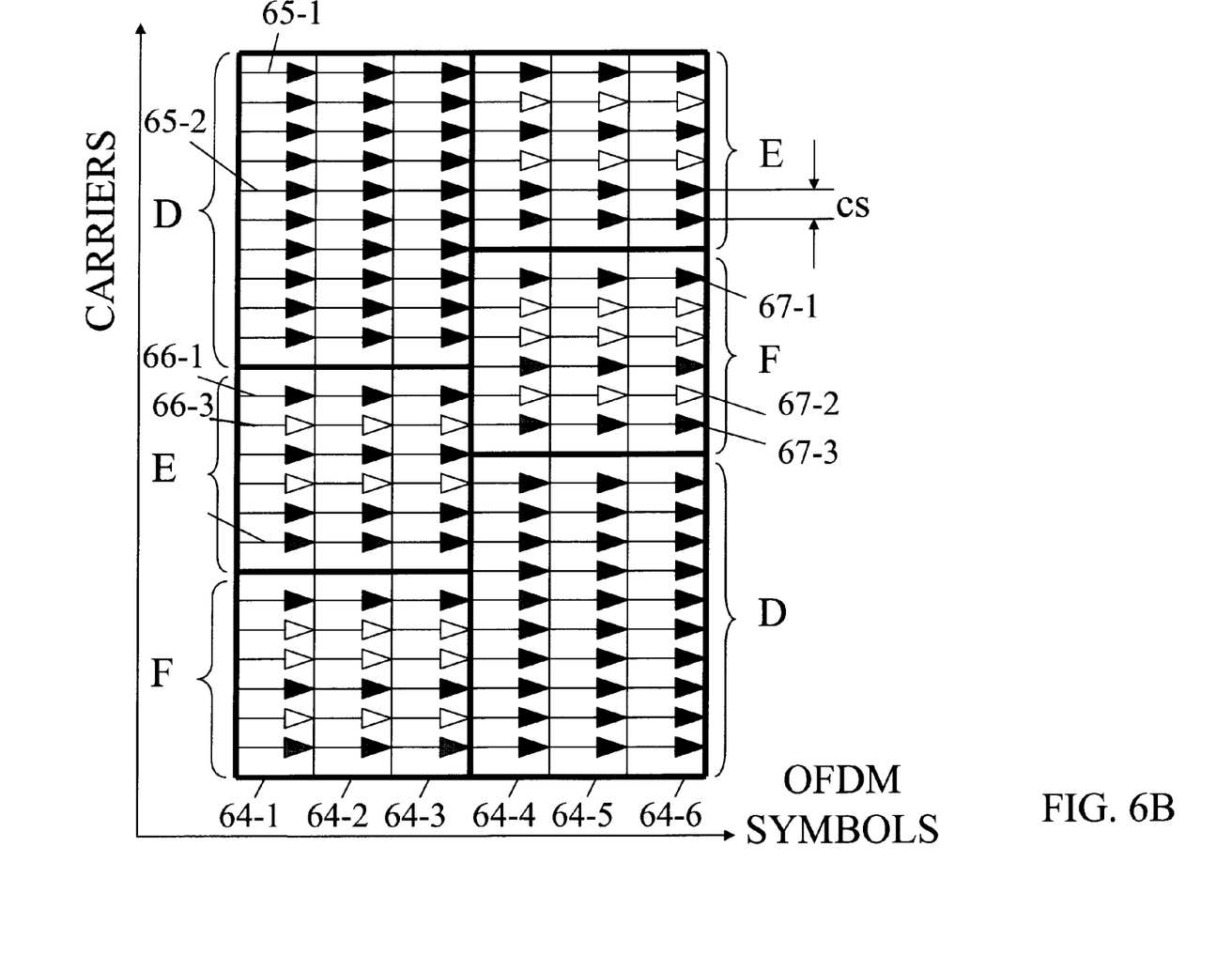
FIG. 6B is an exemplary diagram illustrating a method of allocating data symbols and pilot signals in an OFDMA-based system.

FIG. 6B is an exemplary diagram illustrating a method of allocating data symbols and pilot signals in an OFDMA-based system. Referring to FIG. 6B, symbols 64-1 to 64-6 may each be used to transmit data symbols (shown in dark arrowheads) and pilot signals (shown in gray arrowheads). In one example, resource regions "D" may be allocated to at least one communication device having a relatively low relative speed. Accordingly, data symbols 65-1 may be allocated at a relatively high density and pilot signals 65-2 may be allocated at a relatively low density. In the present example, no sacrifice carriers are used in the resource regions D. Furthermore, resource regions "E" may be allocated to at least one communication device having a relatively medium relative speed. Accordingly, data symbols 66-1 and pilot signals 66-2 may be allocated at a relatively medium density, and sacrifice carriers 66-3 (shown in white arrowheads) free of data and pilot signals may be arranged at a relatively medium density. Moreover, resource regions "F" may be allocated to at least one communication device having a relatively high relative speed. Accordingly, data symbols 67-1 may be allocated at a relatively low density and pilot signals 67-2 may be allocated at a relatively high density, and sacrifice carriers 67-3 may be arranged at a relatively high density.

In one example, at least one data symbol in the resource region D and the OFDM symbol 64-1 may include information regarding at least one of a coding rate, modulation scheme or pilot density of at least one of the OFDM symbol 64-2 and 64-3 in the resource region D. Likewise, at least one data symbol in the resource region D and the OFDM symbol 64-4 may include information regarding at least one of a coding rate, modulation scheme or pilot density of at least one of the OFDM symbol 64-5 and 64-6 in the resource region D. Furthermore, at least one data symbol in the resource region E and the OFDM symbol 64-1 may include information regarding at least one of a coding rate, modulation scheme or pilot density of at least one of the OFDM symbol 64-2 and 64-3 in the resource region E. Likewise, at least one data symbol in the resource region E and the OFDM symbol 64-4 may include information regarding at least one of a coding rate, modulation scheme or pilot density of at least one of the OFDM symbol 64-5 and 64-6 in the resource region E. Moreover, at least one data symbol in the resource region F and the OFDM symbol 64-1 may include information regarding at least one of a coding rate, modulation scheme or pilot density of at least one of the OFDM symbol 64-2 and 64-3 in the resource region F. Likewise, at least one data symbol in the resource region F and the OFDM symbol 64-4 may include information regarding at least one of a coding rate, modulation scheme or pilot density of at least one of the OFDM symbol 64-5 and 64-6 in the resource region F.

Figure 7:
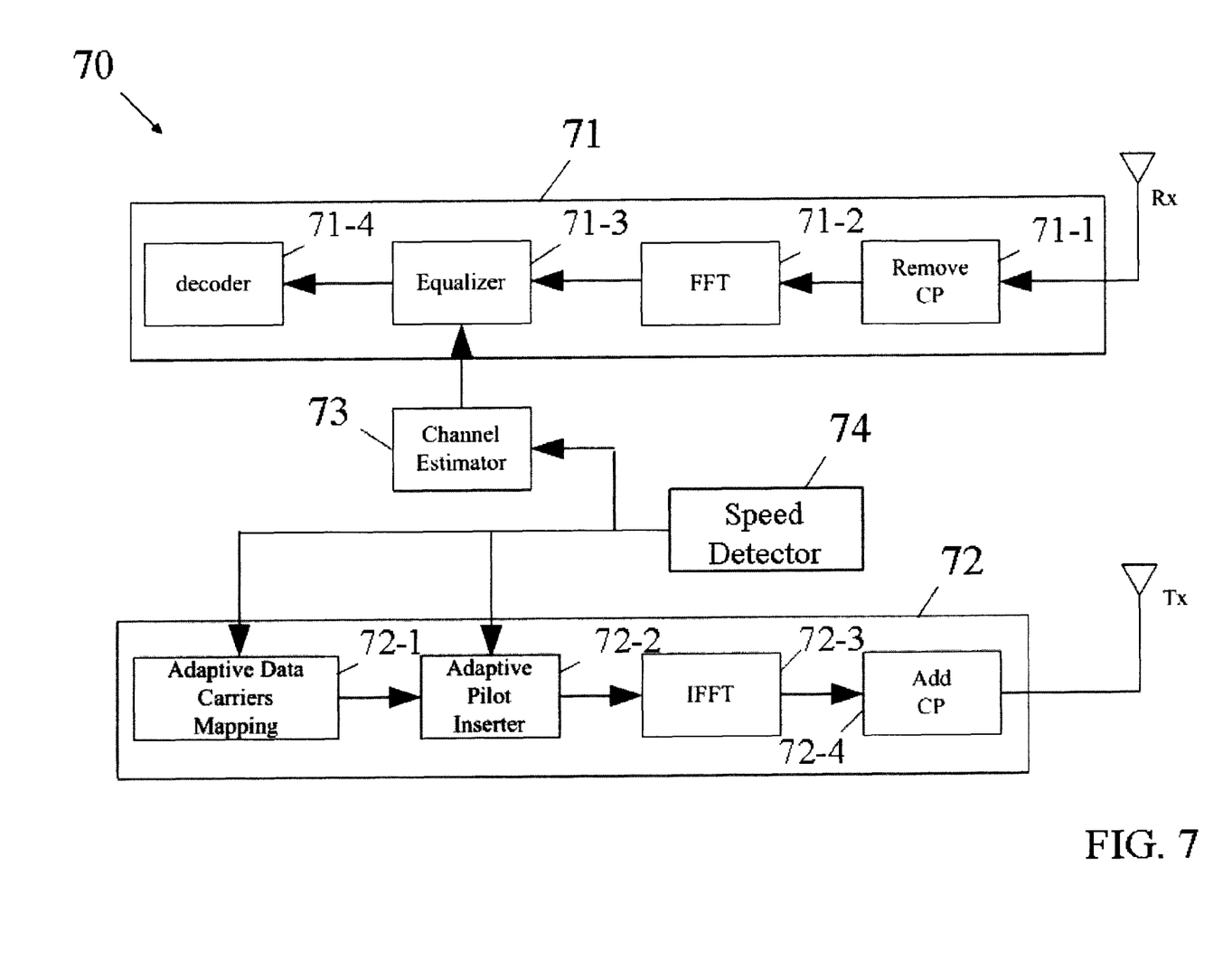
FIG. 7 is a block diagram of a transceiver consistent with an example of the present invention.

FIG. 7 is a block diagram of a transceiver 70 consistent with an example of the present invention. Referring to FIG. 7, the transceiver 70, which may be configured to allocate pilot signals, may include a receiver 71, a transmitter 72, a channel estimator 73 and a speed detector 74. The speed detector 74 may detect a relative speed between a transmitter station and a receiver station, and provide information regarding the detected relative speed to the channel estimator 73. In one example consistent with the present invention, a message including the information on a relative speed between a transmitter station and a receiver station may be sent from one of the transmitter station and the receiver station to the other, and therefore the speed detector 74 may be eliminated. The receiver 71 may further include a cyclic prefix (CP) remover 71-1, a fast Fourier transform (FFT) processor 71-2, an equalizer 71-3 and a decoder 71-4. A symbol obtained by a radio frequency (RF) receiver (not shown) from a signal received from, for example, a mobile station, through an antenna "RX" may be input into the CP remover 71-1, where a cyclic prefix (CP) inserted by a transmitting side may be removed from the symbol. The symbol from which the CP has been removed may be input into the FFT processor 71-2 for fast Fourier transformation. The fast Fourier transformed symbol may be applied to the equalizer 71-3, which may compensate a fast Fourier transformed data signal for channel distortion according to a channel value estimated by the channel estimator 73. The decoder 71-4 may recover original data from the data signal in which the compensation for the channel distortion has been made. In one example, the channel estimator 73 may be configured to identify the allocation of data carriers based on the relative speed. Furthermore, the channel estimator 73 may also be configured to identify the allocation of pilot signals based on the relative speed.

The transmitter 72 may further include a data mapping circuit 72-1, a pilot inserter 72-2, an inverse fast Fourier transform (IFFT) processor 72-3 and a CP inserter 72-4. The data mapping circuit 72-1, which may be coupled to the speed detector 74, may be configured to map data carriers to be transmitted to a mobile station based on the detected relative speed. The pilot inserter 72-2, which may also be coupled to the speed detector 73, may be configured to insert pilot signals into an output of the data mapping circuit 72-1 based on the detected relative speed. An output signal of the pilot inserter 72-2 may be inverse fast Fourier transformed by the IFFT processor 72-3. A CP may then be inserted into the inverse fast Fourier transformed signal by the CP inserter 72-4. An output signal of the CP inserter 72-4 may be transmitted by an RF transmitter (not shown) to the mobile station through an antenna "TX".

Figure 8A:
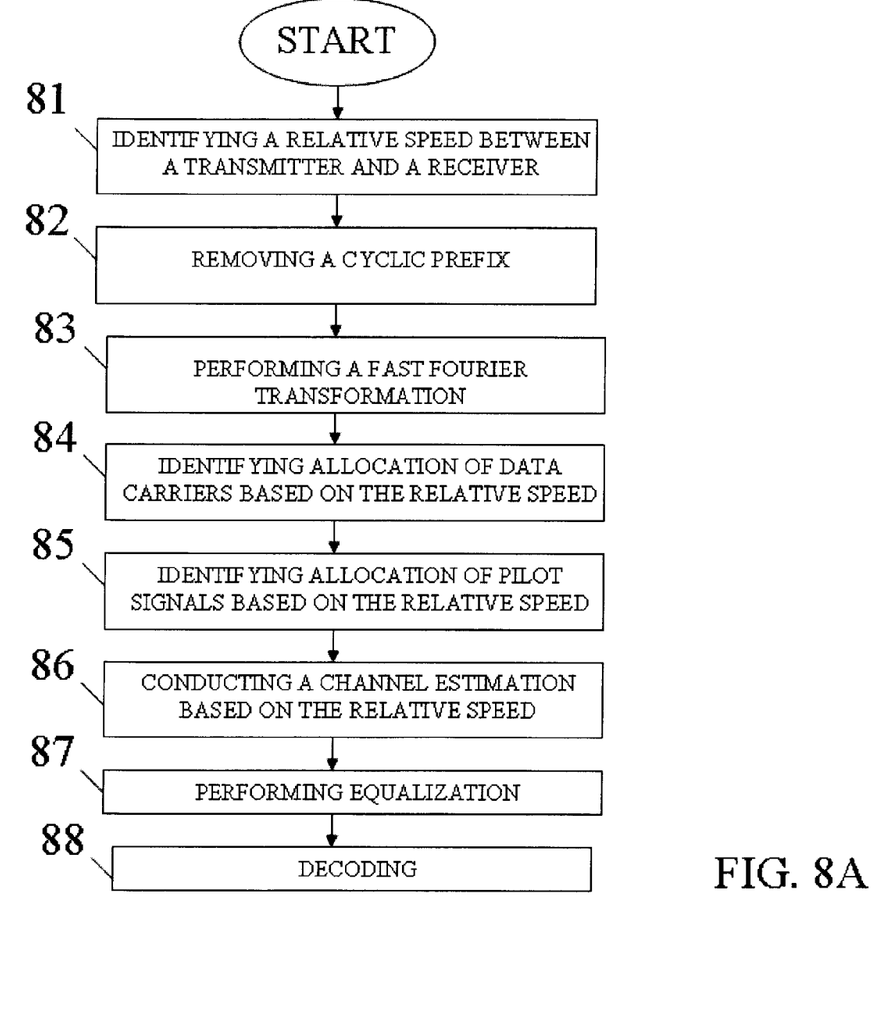
FIG. 8A is a flow diagram illustrating a method of data communication consistent with an example of the present invention.

FIG. 8A is a flow diagram illustrating a method of data communication consistent with an example of the present invention. Referring to FIG. 8A, also referring to FIG. 7, at step 81, a relative speed between a transmitter and a receiver may be obtained by, for example, a speed detector, or by receiving a message including information on the relative speed. At step 82, a CP may be removed from a received symbol. Next, an FFT may be performed at step 83. Allocation of data carriers may be identified based on the relative speed at step 84. Allocation of pilot signals may be identified at step 85. Next, at step 86, channel estimation may be made. At step 87, an equalization process may be performed. Subsequently, a decoding process may be performed at step 88.

Figure 8B:
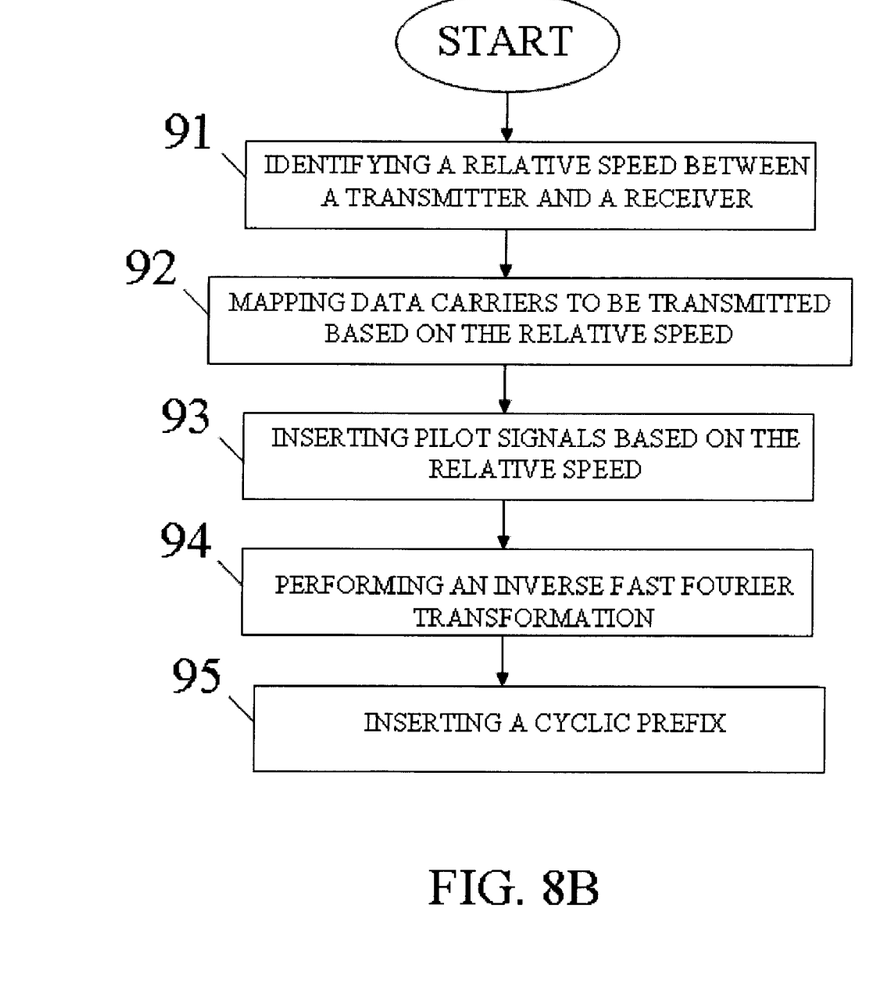
FIG. 8B is a flow diagram illustrating a method of data communication consistent with another example of the present invention.

FIG. 8B is a flow diagram illustrating a method of data communication consistent with another example of the present invention. Referring to FIG. 8B, also referring to FIG. 7, at step 91, a relative speed between a transmitter and a receiver may be obtained by, for example, a speed detector, or by receiving a message including information on the relative speed. At step 92, data carriers to be transmitted may be mapped based on the relative speed. Pilot signals may be allocated based on the relative speed at step 93. Next, an IFFT may be performed at step 94. Subsequently, a CP may be inserted at step 95.

It will be appreciated by those skilled in the art that changes could be made to the examples described above without departing from the broad inventive concept thereof. It is understood, therefore, that this invention is not limited to the particular examples disclosed, but it is intended to cover modifications within the spirit and scope of the present invention as defined by the appended claims.

Further, in describing certain illustrative examples of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

We claim:

1. A method of data communication in a multi-user, multi-carrier wireless communication system, the method comprising:

identifying a resource region including a plurality of symbols;
allocating pilot signals to the resource region;
identifying pilot-free symbols free of the pilot signals in the plurality of symbols;
arranging sacrifice carriers for a first region of a group of symbols in the pilot-free symbols at a first density for a first communication station;
arranging sacrifice carriers for a second region of the group of symbols in the pilot-free symbols at a second density for a second communication station;
allocating data to first carriers in the first region of the group of symbols in the pilot-free symbols; and
allocating data to second carriers in the second region of the group of symbols in the pilot-free symbols,
wherein at least one of the first carriers or at least one of the second carriers in a first symbol of the group of symbols includes information regarding at least one of a coding rate, modulation scheme or pilot density of at least one second symbol of the group of symbols following the first symbol in the pilot-free symbols,
wherein the first communication station is mobile with respect to an access communication station at a first relative speed and the second communication station is mobile with respect to the access communication station at a second relative speed, and
wherein the first density of sacrifice carriers is greater than the second density of sacrifice carriers if the first relative speed is greater than the second relative speed.

2. The method of claim 1, wherein the group of symbols in the pilot-free symbols is disposed between symbols allocated with pilot signals.

3. The method of claim 1 further comprising:
arranging sacrifice carriers for a third region of the group of symbols in the pilot-free symbols at a third density for a third communication station.

4. The method of claim 3, wherein the third communication station is mobile with respect to the access communication station at a third relative speed, and wherein the first density of sacrifice carriers is smaller than the third density of sacrifice carriers if the first relative speed is smaller than the third relative speed, and vice versa.

5. The method of claim 3, wherein the third communication station is mobile with respect to the access communication station at a third relative speed, and the second density of sacrifice carriers is greater than the third density of sacrifice carriers if the second relative speed is greater than the third relative speed, and vice versa.

6. The method of claim 1, wherein the first carriers in one of the group of symbols are separated from one another by a first number of sacrifice carriers and the second carriers in the one of the group of symbols are separated from one another by a second number of sacrifice carriers, and wherein the first number of sacrifice carriers is greater than the second number of sacrifice carriers.

7. The method of claim 1, wherein at least one of the first carriers in the first symbol of the group of symbols includes information regarding at least one of a coding rate, modulation scheme or pilot density of at least one second symbol of the group of symbols following the first symbol in the pilot-free symbols.

8. The method of claim 1, wherein at least one of the second carriers in the first symbol of the group of symbols includes information regarding at least one of a coding rate, modulation scheme or pilot density of at least one second symbol of the group of symbols following the first symbol in the pilot-free symbols.

9. The method of claim 1, wherein the multi-user, multi-carrier wireless communication system comprises an orthogonal frequency division multiplexing (OFDM)-based communication system,
wherein identifying a resource region includes identifying a resource region including a plurality of OFDM symbols, and
wherein allocating pilot signals to the resource region includes allocating pilot signals to OFDM symbols in the resource region based on the first relative speed and the second relative speed.

10. A method of data communication in a multi-user, multi-carrier communication wireless system, the method comprising:
identifying at least one resource region each including a plurality of symbols;
assigning a first one of the at least one resource region to at least one communication device having a first relative speed;
assigning a second one of the at least one resource region to at least one communication device having a second relative speed, the second relative speed being greater than the first relative speed;
allocating at least one of data or data and pilot signals to carriers in each of the first one and the second one of the at least one resource region;
arranging sacrifice carriers free of the data and pilot signals for the first one of the at least one resource region at a first density; and
arranging sacrifice carriers free of the data and pilot signals for the second one of the at least one resource region at a second density; the second density of sacrifice carriers being greater than the first density of sacrifice carriers,
wherein at least one carrier in a first symbol of the plurality of symbols in the first one or second one of the at least one resource region includes information regarding at least one of a coding rate, modulation scheme or pilot density of at least one second symbol of the plurality of symbols following the first symbol in the first one or second one of the at least one resource region.

11. The method of claim 10, wherein at least one carrier in a the first symbol of the plurality of symbols in the first one of the at least one resource region includes information regarding at least one of a coding rate, modulation scheme or pilot density of at least one second symbol of the plurality of symbols following the first symbol in the first one of the at least one resource region.

12. The method of claim 10, wherein at least one carrier in a the first symbol of the plurality of symbols in the second one of the at least one resource region includes information regarding at least one of a coding rate, modulation scheme or pilot density of at least one second symbol of the plurality of symbols following the first symbol in the second one of the at least one resource region.

13. The method of claim 10 further comprising:
allocating the at least one of data or data and pilot signals to first carriers in the first one of the at least one resource region; and
allocating the at least one of data or data and pilot signals to second carriers in the second one of the at least one resource region.

14. The method of claim 13, wherein the first carriers in one of the plurality of symbols in the first one of the at least one resource region are separated from one another by a first number of sacrifice carriers and the second carriers in one of the plurality of symbols in the second one of the at least one resource region are separated from one another by a second number of sacrifice carriers, and wherein the second number of sacrifice carriers is greater than the first number of sacrifice carriers.

15. The method of claim 13 further comprising:
allocating at least one of data or data and pilot signals to third carriers in a third one of the at least one resource region for a third communication device having a third relative speed, wherein the third carriers in one of the plurality of symbols in the third one of the at least one resource region are separated from one another by a third number of sacrifice carriers.

16. The method of claim 15, wherein the first number of sacrifice carriers is greater than the third number of sacrifice carriers if the first relative speed is greater than the third relative speed, and vice versa.

17. The method of claim 10, wherein the multi-user, multi-carrier wireless communication system comprises an orthogonal frequency division multiplexing (OFDM)-based communication system,
wherein identifying at least one resource region includes identifying at least one resource region each including a plurality of OFDM symbols, and
wherein allocating at least one of data or data and pilot signals includes allocating pilot signals to carriers of OFDM symbols in the first one of the at least one resource region at a density based on the first relative speed, and to carriers of OFDM symbols in the second one of the at least one resource region at a density based on the second relative speed.

18. A device for data communication in a multi-user, multi-carrier wireless communication system, the device comprising:
a speed detector configured to detect a first relative speed of a first communication station relative to an access communication station and a second relative speed of a second communication station relative to the access communication station;
an adaptive pilot inserting module configured to allocate pilot signals to a resource region based on the first relative speed and the second relative speed, the resource region including a plurality of symbols; and
an adaptive carrier mapping module configured to allocate data to the resource region,
wherein at least one carrier in a first symbol of the plurality of symbols in the resource region includes information regarding at least one of a coding rate, modulation scheme or pilot density of at least one second symbol of the plurality of symbols following the first symbol in the resource region,
wherein the adaptive carrier mapping module is configured to arrange sacrifice carriers in a first region of the resource region at a first density for the first communication station, and arrange sacrifice carriers in a second region of the resource region at a second density for the second communication station, and
wherein the first density of sacrifice carriers is greater than the second density of sacrifice carriers if the first relative speed is greater than the second relative speed, and vice versa.

19. The device of claim 18, wherein the speed detector detects a third relative speed of a third communication station relative to the access communication station, and the adaptive carrier mapping module arranges sacrifice carriers in a third region of the resource region at a third density for the third communication station.

20. The device of claim 19, wherein the first density of sacrifice carriers is smaller than the third density of sacrifice carriers if the first relative speed is smaller than the third relative speed, and vice versa.

21. The device of claim 19, wherein the second density of sacrifice carriers is greater than the third density of sacrifice carriers if the second relative speed is greater than the third relative speed, and vice versa.

22. The device of claim 18, wherein the multi-user, multi-carrier wireless communication system comprises an orthogonal frequency division multiplexing (OFDM)-based communication system, wherein the resource region includes a plurality of OFDM symbols, and
wherein the adaptive pilot inserting module is configured to allocate pilot signals to OFDM symbols in the resource region based on the first relative speed and the second relative speed.

* * * * *

UNITED STATES PATENT AND TRADEMARK OFFICE
CERTIFICATE OF CORRECTION

PATENT NO. : 8,036,190 B2  
APPLICATION NO. : 12/036175  
DATED : October 11, 2011  
INVENTOR(S) : Hsiao et al.

Page 1 of 1

It is certified that error appears in the above-identified patent and that said Letters Patent is hereby corrected as shown below:

Title page,

Item (60) Related U.S. Application Data, "Feb. 7, 2007" should read --Feb. 27, 2007--.

Signed and Sealed this  
Tenth Day of July, 2012

David J. Kappos  
*Director of the United States Patent and Trademark Office*